United States Patent [19]

Piepho

[11] 4,299,420
[45] Nov. 10, 1981

[54] LICENSE DOOR HOLDER ASSEMBLY

[76] Inventor: Roy L. Piepho, Rte. 4, Sterling, Ill. 61081

[21] Appl. No.: 65,636

[22] Filed: Aug. 10, 1979

[51] Int. Cl.³ ............................................. B62D 25/00
[52] U.S. Cl. ................................................... 296/1 C
[58] Field of Search .............. 296/1 C; 292/DIG. 15, 292/DIG. 9, 338; 49/386; 16/138; 108/78

[56] References Cited

U.S. PATENT DOCUMENTS

| 387,760 | 8/1888 | Brack | 108/78 |
|---|---|---|---|
| 3,905,637 | 9/1975 | Smith | 296/1 C |

4,172,611 10/1979 Krus .................................. 296/1 C

*Primary Examiner*—Robert R. Song
*Attorney, Agent, or Firm*—Hiram A. Sturges

[57] ABSTRACT

A license door holder assembly comprising an automobile having a gasoline spout receiving opening in it's rearward side, covered by a license door hinged thereto and adapted to fold downwardly and rearwardly at it's upper end, a door holder having a lock section pivotable to a position over the door sufficient to maintain the license door in an open position at times when gasoline is being pumped into the automobile.

5 Claims, 5 Drawing Figures

LICENSE DOOR HOLDER ASSEMBLY

BACKGROUND OF THE INVENTION

In the past various proposals have been made for devices to hold license doors open on automobiles. To my knowledge none has been placed in production.

An object of this invention is to provide a door holding arm which can be attached to doors with ease, and which will be received for storage within the recess surrounding the gas pipe of many types of automobiles to provide a versatility to make mass production possible for sales as a general accessory.

Another object is to provide a license door arm which can be easily installed during new car production. In this respect a major feature is that the arm of this invention can be placed into use without redesigning the car body and actually by drilling only one hole for economy of production.

SUMMARY OF THE INVENTION

A major goal of this invention is to provide a license door holder assembly comprising an automobile having a gasoline spout-receiving opening in its rearward side, covered by a license door hinged thereto and adapted to fold downwardly and rearwardly at its upper end, a door holder having a lock section pivotable to a position over the door sufficient to maintain the license door in an open position at times when gasoline is being pumped into the automobile.

DESCRIPTION OF THE PREFERRED EMBODIMENT

Figure 1:
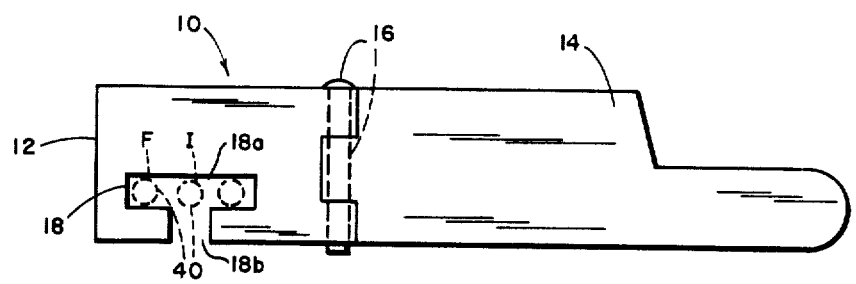
FIG. 1 is a side elevation of the license door holder shown being unconnected to an automobile.

In FIG. 1 a license door holder from a license door holding assembly is generally indicated at 10 and comprises a mounting section 12 connected to a locking section 14 by a holder hinging assembly 16. The mounting section 12 contains a mounting slot 18 into which an attaching member, fastener or bolt 3 is inserted when mounting the door holder onto an automobile.

The door holder is fitted onto the bolt 40 by first slipping the open end of the mounting slot 18 over the bolt shank 40 to reach an initial position I. The mounting section 12 is then moved to bring the bolt shaft 40 to it's final position F in the mounting slot 18.

As best seen in FIG. 1, the mounting slot 18 opens toward the downward side of the mounting section 12, and the slot 18 is wider from left to right in its upper portin 18a than in its lower portion 18b. It is the upper portion 18a that receives the bolt shaft 40 in its final position and the upper portion is elongated from right to left to a dimension at least twice the right-to-left dimension of that portion of the attaching bolt shaft 40 which is disposed in the slot 18 of the mounting section.

Figure 2:
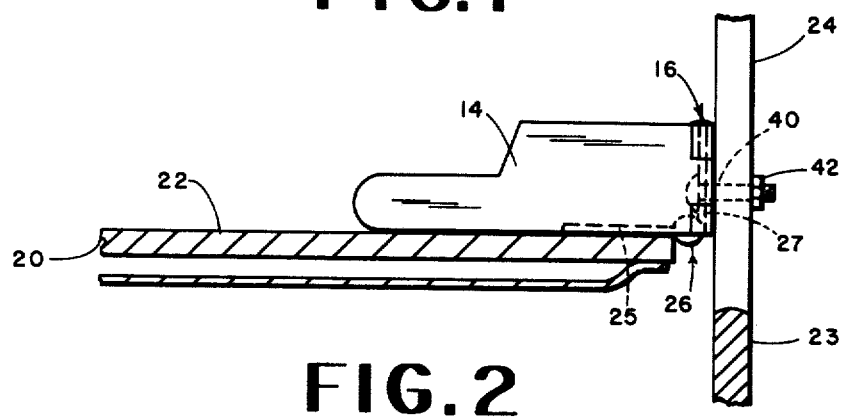
FIG. 2 is a right side elevation of the rearward end of an automobile shown with the doorholder of this invention in a position for holding the door open and with the rearmost portions of the door and license plate attached thereto being broken away, the entire automobile being broken away except a small section of the rearward end thereof to which the door is hinged.
Figure 3:
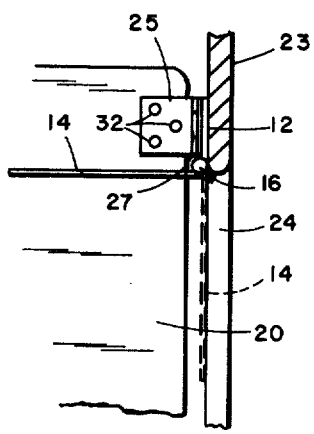
FIG. 3 is a top plan view of the license door holder assembly shown in FIG. 2, a dotted line showing the storage position of the locking section of the holder.

In FIG. 2, a license plate door 20, having a substantially planar inner side 22, is hingably mounted to an upright rearward side portion of an automobile 23, best seen in FIG. 3, by means of a door hinging assembly 26. A rearward section 25 of the door hinging assembly 26 attaches to the license door inner side 22. A forward section 27 of the holder hinging assembly 26 attaches to the automobile 23.

The license door 20 is disposed rearwardly from the rear of the automobile, and covers a gasoline spout receiving opening 24 when in a closed position. When pumping gas into the automobile, the license plate door 20 is held open by the lock section 14 of the license plate door holder.

In FIG. 3, the license plate door 20 is held in an open position by the lock section 14, which rotates on a vertical axis in relation to the mounting section 12. An alternative position of the lock section is also indicated by 14. This alternative position being used when the license plate door is in a closed position in respect to to the automobile.

Figure 4:
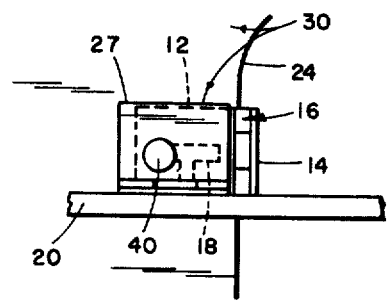
FIG. 4 is a rear elevation of the license door holder assembly while the door is in an open position, a license plate not being shown in this view.
Figure 5:
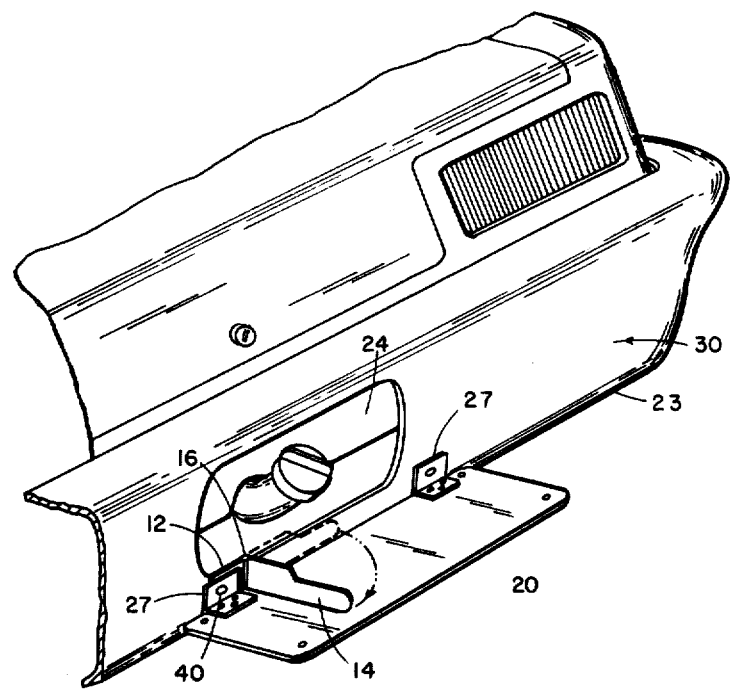
FIG. 5 is a perspective view of a rear end portion of an automobile showing the plate door and holder in open positions.

The rearward side portion of the automobile 23 and the forward section 27 of the holder hinging assembly 26 combine to form an anchoring assembly 30, as shown in FIG. 4.

The mounting section 12 of the license plate door holder is held to the automobile by the anchoring assembly 30 and the bolt 40.

FIG. 3 also shows mounting bolts 32 which are used to hold the license door 20 to the hinging assembly rearward section 25.

I claim:

1. A license door holder assembly comprising an automobile having an upright rearward side portion provided with a gasoline spout-receiving opening, a license plate door disposed rearwardly of said opening, said door having an inner substantially planar side normally facing said opening for at least partially covering said opening when said door is in closed position, the upper edge of said door being movable rearwardly and downwardly to an open position, said license plate door being substantially planar on its said inner side, hinge means securing said door to the rearward side of said automobile, said hinge means having a forward section attached to said automobile and having a rearward section attached to said door, said hinge means sections hinging about a horizontal axis, a door holder having a mounting section, means attaching said mounting section of said door holder to said automobile, said door holder having a locking section, means attaching said locking section to said mounting section in a manner for pivoting about an upright axis, said locking section being placeable in a door-locking position extending rearwardly from said upright axis out across the upper side of said door when said door is in said open position, said locking section being of sufficiently small dimension in a direction from its forward side to its rearward side as seen at times when said locking section is in storage position disposed parallel to said inner side of said door that said locking section will not substantially interfere with the movement of said door from said open position to said closed position, said mounting section having an elongated slot into which said means attaching said mounting section of said door holder to said automobile is disposed.

2. The license door holder assembly of claim 1 having said slot opening at the lower side of said mounting section.

3. The license door holder assembly of claim 1 having said slot opening at a side of said mounting section and being elongated from right to left to a dimension at least substantially twice the right to left dimension of that portion of said attaching means which is in said mounting section.

4. A license door holder assembly comprising an automobile having an upright rearward side portion provided with a gasoline spout-receiving opening, a license plate door disposed rearwardly of said opening, said door having an inner substantially planar side normally facing said opening for at least partially covering said opening when said door is in closed position, the upper edge of said door being movable rearwardly and downwardly to an open position, said license plate door being substantially planar on its said inner side, hinge means securing said door to the rearward side of said automobile, said hinge means having a forward upwardly extending section attached to said automobile and having a rearward section attached to said door, said hinge means sections hinging about a horizontal axis, a door holder having a mounting section, means attaching said mounting section of said door holder to said automobile, said door holder having a locking section, means attaching said locking section to said mounting section in a manner for pivoting about an upright axis, said locking section being placeable in a door-locking position extending rearwardly from said upright axis out across the upper side of said door when said door is in said open position, said locking section being of sufficiently small dimension in a direction from its forward side to its rearward side as seen at times when said locking section is in storage position disposed parallel to said inner side of said door that said locking section will not substantially interfere with the movement of said door from said open position to said closed position, said forward section of said hinge means having a hinge attachment member opening therethrough, said mounting section having a hole extending forwardly therethrough, said mounting section being in a lapping relationship with said forward section of said hinge means, said means attaching said mounting section of said door holder to said automobile comprising a fastener having a shank extending through said hinge attachment member opening and also through said hole in said door holder mounting section, said mounting section hole being substantially larger than said shank so as to permit a positioning of said door holder mounting section at substantially varying positions along said hinge axis for fitting automobiles of different sizes.

5. The license door holder assembly of claim 4 having said hole opening at a side of said mounting section and being elongated from right to left to a dimension at least substantially twice the right to left dimension of said shank which is in said mounting section.

* * * * *